United States Patent [19]
Dischert et al.

[11] 4,320,416
[45] Mar. 16, 1982

[54] TECHNIQUE FOR OPTIMALLY ENCODING DIGITALLY ENCODED VIDEO SIGNALS

[75] Inventors: Robert A. Dischert, Burlington; Eugene M. Nagle, Middletown; James J. Williams, Jr., Plainsboro, all of N.J.

[73] Assignee: RCA Corporation, New York, N.Y.

[21] Appl. No.: 197,290

[22] Filed: Oct. 15, 1980

[51] Int. Cl.³ .............................................. H04N 7/12
[52] U.S. Cl. .................................... 358/133; 358/138; 375/31; 375/33
[58] Field of Search ................... 358/133, 138, 12, 13; 375/31, 33

[56] References Cited

U.S. PATENT DOCUMENTS

| | | | |
|---|---|---|---|
| 3,462,547 | 8/1969 | Macouski | 358/133 |
| 4,204,227 | 5/1980 | Gurley | 358/13 |
| 4,227,204 | 10/1980 | Rossi | 358/13 |

*Primary Examiner*—Howard Britton
*Attorney, Agent, or Firm*—Paul J. Rasmussen; William H. Meise; Henry I. Steckler

[57] ABSTRACT

An encoder for digital video signals uses averages of pairs of transmitted samples to reconstruct untransmitted samples. The pair selected for reconstruction is selected in accordance with the criteria of least change around the untransmitted sample. If a plurality of averages are tied for least change, a priority order is used to select which average to use. For color video the priority order is preferably the horizontal, diagonal and vertical averages. A different order can be used for monochrome signals.

18 Claims, 6 Drawing Figures

ENCODER

ORIGINAL SAMPLING OF THE PICTURE

SUBSAMPLED VERSION OF THE PICTURE

ENCODER

| LINE NO. | 110 | 112 | 114 | 116 | 110, 112 | 110, 114 | 110, 116 | 112, 114 | 112, 116 | 114, 116 | 110, 116 / 114 | 116, 114 / 112 | 110, 116 / 112 | 110, 114 / 112 | 110, 112, 114, 116 |
|---|---|---|---|---|---|---|---|---|---|---|---|---|---|---|---|
| 154  | 0 | 0 | – | – | 0 | 0 | 0 | 0 | 0 | – | 0 | 0 | 0 | 0 | 0 |
| 156  | 0 | 0 | – | 0 | 0 | 0 | 0 | 0 | 0 | – | 0 | 0 | 0 | 0 | 0 |
| 158  | – | 0 | – | 0 | 0 | – | – | 0 | 0 | – | – | 0 | 0 | 0 | 0 |
| 104a | 0 | 0 | – | – | 0 | 0 | 0 | 0 | 0 | – | 0 | 0 | 0 | 0 | 0 |
| 104b | – | 0 | – | 0 | 0 | – | – | 0 | 0 | – | – | 0 | 0 | 0 | 0 |

COMPARATOR PROVIDING LOWEST SIGNAL

Fig. 6

TECHNIQUE FOR OPTIMALLY ENCODING DIGITALLY ENCODED VIDEO SIGNALS

BACKGROUND OF THE INVENTION

The present invention relates to digital video systems, and more particularly, to circuits for generating picture reconstruction control or steering bits in the event of a tie for closest match to a deleted sample by surrounding samples.

In digital broadcast systems, the effective use of the data rate is of primary importance. A reduction in data rate reduces both video tape usage and the necessary transmission bandwidth; however, this must be accomplished while maintaining broadcast quality pictures.

One method of data rate reduction which is presently under consideration is the process of sub-Nyquist sampling, such as is disclosed in the paper "Sub-Nyquist Encoded PCM NTSC Color Television" by John P. Rossi in the book "Digital Video", a review of SMPTE papers, and in the article by Leonard S. Golding, "Frequency Interleaved Sampling of a Color Television Signal", IEEE Transactions on Communication Technology, Volume COM-19, page 972, December, 1971. These sub-Nyquist type systems have samples with the diagonal distance between the samples being greater than the horizontal distance between the samples. Since the smaller the distance between samples the greater the resolution, these systems are capable of increasing the horizontal resolution which is available at a given data rate, but at the expense of the diagonal resolution.

A system for overcoming this disadvantage is shown in U.S. patent application No. 132,137, filed Mar. 20, 1980, (RCA 74,547), now abandoned in favor of continuation application Ser. No. 168,077, filed July 14, 1980 (RCA 74,547A), both entitled "Data Rate Reduction For Digital Video Signals By Subsampling And Adaptive Reconstruction". The method of said applications comprises dividing a signal into first and second time portions, transmitting the first portion, and transmitting a control signal adapted to control the reconstruction of said second portion from the transmitted first portion. The control signal is generated by comparing combinations of samples of the transmitted first portions with a sample of the untransmitted second portions, and determining which combination is the closest match to the second portion sample, the control signal indicating which combination is the closest match for best reconstruction of untransmitted second portion samples at a receiver. However, a problem arises if at least two of said combinations are tied for best match. The circuitry will generate a control signal that indicates that an arbitrary one of said tied combinations is the best match. This sometimes results in "artifacts", which are black or white speckles occurring at the intersection horizontal and vertical lines or at the intersection of diagonal lines. It is therefore desired to reduce the occurrence of artifacts.

SUMMARY OF THE INVENTION

The present invention is a method and apparatus for transmitting signals comprising transmitting a first time portion, and transmitting a control signal adapted to control the reconstruction of the untransmitted second portion from the transmitted first portion, said first portion comprising a plurality of samples and said control signal indicating which of said samples is the closest match to said second portion and indicating a selected sample in a selected priority order if there is a tie for said closest match.

DESCRIPTION OF THE DRAWINGS

FIG. 6 is a table of logic states existing on certain interconnecting lines of FIG. 5 as a function of which direction is the best match.

DETAILED DESCRIPTION OF THE INVENTION

Figure 1:
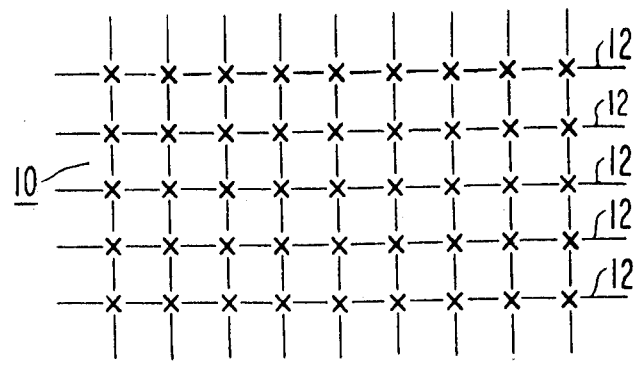
FIG. 1 illustrates a raster produced by simultaneous vertical and horizontal scanning of an electron beam with sample points thereon.

FIG. 1 shows a video raster 10 comprising a plurality of horizontal scanning lines 12. Each of the letters "X" represents a sampling point, which typically is 8-bit or byte sampled for a total of 256 gray levels. These sampling points occur in a preferred embodiment at 14.32 MHz, which is four times the NTSC color subcarrier frequency. This sampling rate results in horizontally adjacent samples occurring at about 70 nanosecond intervals.

Figure 2:
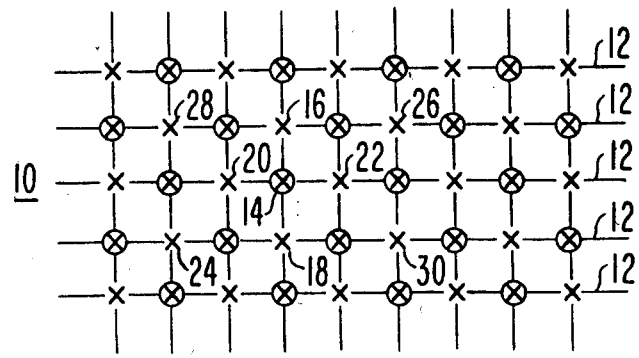
FIG. 2 illustrates a sub-sampled version of the same raster.

FIG. 2 is a similar drawing wherein corresponding elements have been given corresponding reference numerals. Here each circled "X" represents samples which will not be transmitted or recorded. For each sample that is not so transmitted or recorded, various combinations of the spatially surrounding samples are computed and compared to the sample not transmitted. For example, the sample representing point 14 is compared with the average of the sampled points above and below it, namely points 16 and 18. It is also compared to the average of points to its left and right, namely points 20 and 22. The sample representing point 14 is also compared to the average of the transmitted points 24 and 26 which are in one diagonal relationship to it, and also to the average of transmitted points 28 and 30 which are in another diagonal relationship to it. Which ever comparison provides the closest match is indicated by "steering" or control bits. These control bits are transmitted as additional bits along with the samples that represent the uncircled points in FIG. 2, and together with those samples, are used by a decoder to reconstruct a high resolution picture from reduced data rate information.

Figure 3:
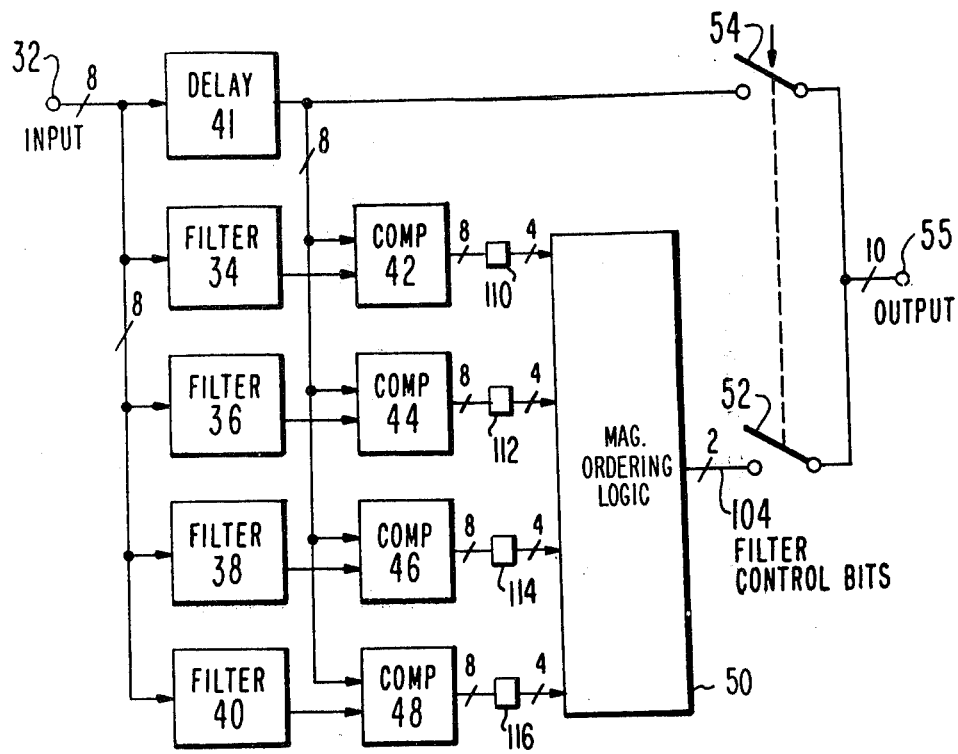
FIG. 3 illustrates a block diagram of an encoder for encoding samples of a video signal and control signals.

FIG. 3 shows an encoder for achieving this. An input 32 receives the digital video signal having samples occurring, in a particular embodiment, at 14.32 MHz (every 70 nanoseconds) with 8 bits per sample. The 8 bits of each sample are applied to a delay line 41 and to filters 34, 36, 38 and 40. These filters are used to provide the average of the surrounding samples. By "average" is meant adding together the values represented by the two signals and dividing the resulting sum by two. For example, filter 34 provides the average of points 28 and 30 (a "first diagonal" average). As is known in the art, it may comprise an 8 bit digital delay line (not shown), having a delay of two horizontal lines, or about 127 microseconds, plus four samples, or about 280 nanoseconds in the NTSC system. The undelayed signal and the output signal of the delay line are averaged within filter 34, and then fed to a comparator 42. Delay line 41 has a delay of about 63.5 microseconds plus 140 nanoseconds, i.e., one-half of the total delay of delay line of filter 34, to delay the sample that is not transmitted so it will be in time coincidence with the averaged signal from filter 34 so the two signals can be compared by comparator 42. Assuming filter 36 supplies the average of points 20 and 22, (a "horizontal" average), it can comprise an 8-bit digital delay line having delay of 2 samples or about 140 nanoseconds. The input (undelayed) and output (delayed) signals of this delay line are averaged. An additional equalizing delay of one line plus 70 nanoseconds to compensate for the delay of delay line 41 is first provided within filter 36. The output signal of filter 36 is supplied to a comparator 44. Assuming filter 38 supplies the average of diagonal points 24 and 26 (a "second diagonal" average), it can comprise first a 280 nanosecond delay equalizer and then an 8-bit digital delay line having a delay of two horizontal lines minus 280 nanoseconds. The delayed and undelayed signals at the input and output of said delay line are averaged and the digital signal representing the average of the signal at points 24 and 26 is then applied to a comparator 46. Lastly, assuming that filter 40 supplies the average of points 16 and 18 (a "vertical" average), it can comprise first a 140 nanosecond delay equalizer, and then an 8-bit digital delay line having a delay of two horizontal lines. The delayed and undelayed signals at the input and output of said delay line are averaged, and then the output signal is supplied to a comparator 48. Comparators 42, 44, 46 and 48 each comprise a subtractor that also receives the original 8-bit samples through delay line 41 in addition to the outputs of the filters 34, 36, 38 and 40, respectively. The respective two signals in each comparator are subtracted and then the absolute value is taken of the resulting difference. The comparators 42, 44, 46, 48 apply 8-bit absolute value signals to truncation circuits 110, 112, 114 and 116, which truncation circuits apply 4-bit absolute-value signals to a minimum error logic circuit 50. U.S. patent application No. 181,425 (RCA 75,069) filed Aug. 26, 1980 in the names of J. J. Williams, Jr. and R. A. Dischert, and assigned to the assignee of the present invention, entitled "Hardware Reduction For Digital Video System Using Subsampling And Adaptive Reconstruction" is directed to a system using truncation circuits. If any of the differences between said averages of the surrounding points and said point 14 in question equals or exceeds sixteen quantizing levels, that average is effectively not considered as a possible replacement for untransmitted point 14 since due to the high redundancy of video information, another difference will probably be less. This can greatly reduce the amount of hardware required in circuit 50.

Figure 4:
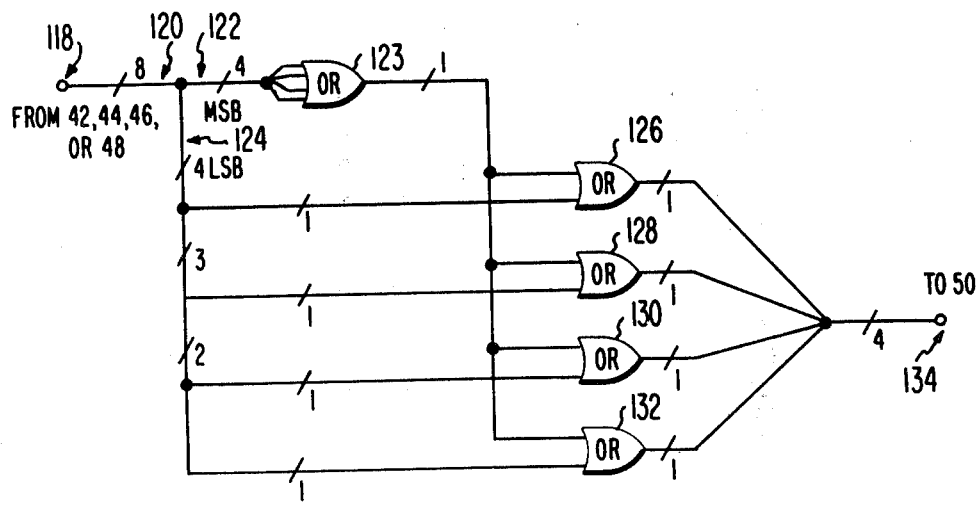
FIG. 4 is a block diagram of a circuit used in FIG. 3 for reducing the amount of hardware required.

FIG. 4 shows a block diagram representing each of the identical truncation circuits 110, 112, 114 and 116 for carrying out the above criterion. Eight-bit input 118 is coupled to the 8-bit output of comparator 42, 44, 46 or 48. An 8-bit bus 120 divides into two 4-bit busses designated 122 and 124. Bus 122 conveys the four most significant bits (MSB) to respective inputs of four-input OR gate 123, while 4-bit bus 124 carries the four least significant bits (LSB) to respective first inputs of OR gates 126, 128, 130 and 132. The output of gate 123 is coupled to the remaining second inputs of gates 126, 128, 130 and 132. The outputs of gates 126–132 are coupled to four-bit output 134, which output is in turn coupled to minimum error logic circuit 50.

In operation, if at least any of the four most significant bits of the difference signal applied to gate 123 are logic "1" (which corresponds to a difference of at least sixteen quantizing levels), the output of gate 123 is logic "1", and thus a logic "1" is applied to all of the first inputs of gates 126, 128, 130 and 132. Hence, the output signals from all of said gates is logic "1" regardless of the state of the signals at their second inputs. The binary number 1111 (equivalent to decimal 15) is applied to the corresponding input of minimum error logic circuit 50. Binary 1111 only requires four 4-bit buses as inputs of circuit 50 instead of four 8-bit buses as in said prior application. Since due to redundancy, another difference is probably smaller, the direction of that smaller difference will be indicated by circuit 50, as explained below.

Figure 5:
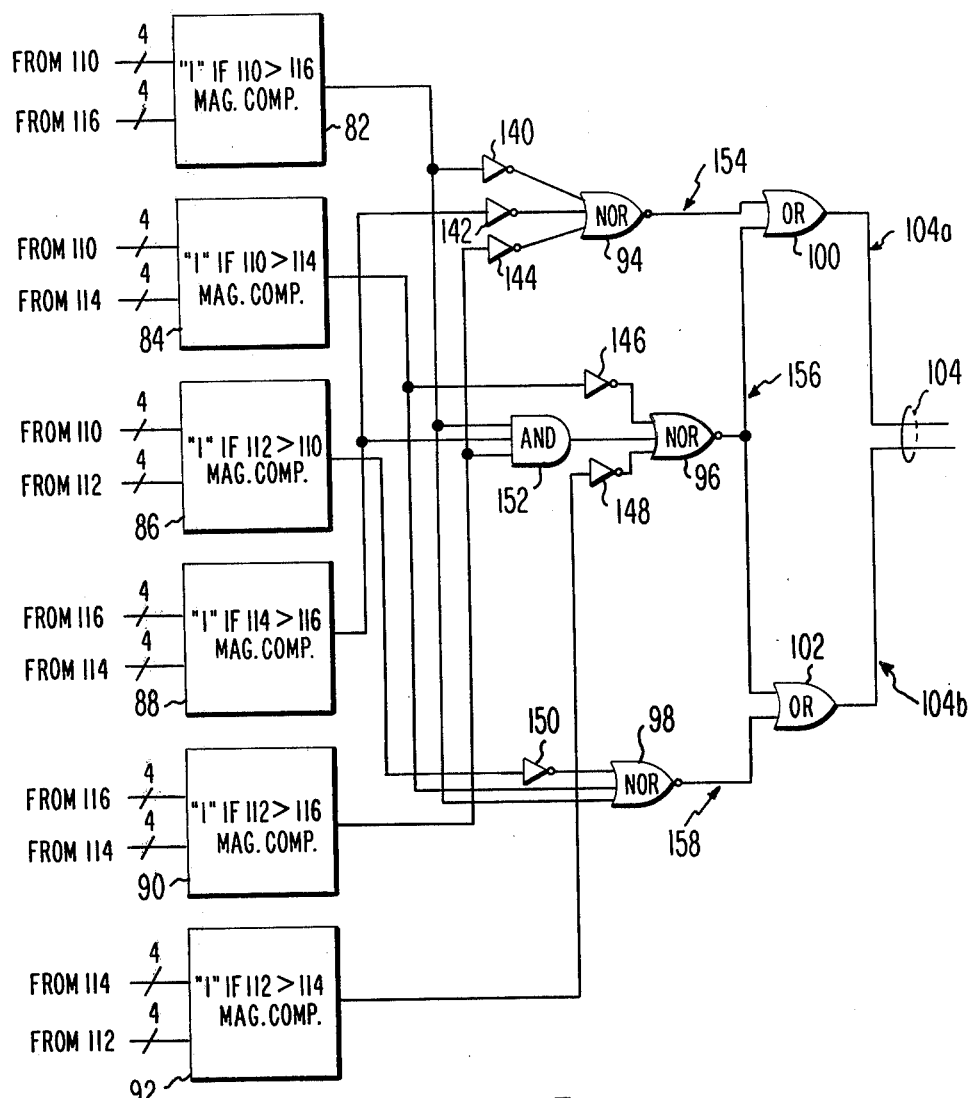
FIG. 5 shows a block diagram of an embodiment of the present invention, which is a magnitude ordering logic circuit used in FIG. 3.

As shown in FIG. 5, magnitude ordering logic circuit 50 comprises six 4-bit magnitude comparators 82, 84, 86, 88, 90 and 92, each of which receives two 4-bit numbers from different pairs of the output signals of truncation circuits 110, 112, 114 and 116 and supplies at its respective output a one-bit logic level indication to indicate which of the two respective input numbers is greater as indicated in the drawing. It should be noted that there are only six possible combinations of four numbers taken in pairs, thus giving rise to the six magnitude comparators. It is only necessary to look at three of the magnitude comparator outputs to determine if a specific magnitude comparator input is the lowest. Thus NOR gates 94, 96 and 98 are used to detect if the output signal from one of truncation circuits 110, 112, and 114, respectively represents the smallest signal difference (the lowest). If at least two are the lowest, there is a tie for the lowest (closest match) between at least two directions, in which case the output signal from the comparators are taken in a selected priority order. It has been empirically determined that the horizontal average is preferred, if it is among the tied directions. This is true since the horizontal direction has higher resolution and therefore averaging in the horizontal direction more nearly equalizes the resolution in all directions. If the horizontal direction is not among those tied, then one of the two diagonal directions is chosen, since these directions preserve color information. The vertical direction does not preserve color information due to the 180 degree phase shift from line to line of the color subcarrier in NTSC. The output signals from gates 94, 96 and 98 are coded by OR gates 100 and 102 into a 2-bit control signal on bus 104 in accordance with the truth table shown in FIG. 6. In FIG. 6, if more than one comparator is indicated as providing the lowest signal, it indicates a tie between the signals provided by such comparators. The states of the indicated lines are indicated by "1" or "0" for the different possibilities. A dash means the state is irrelevant for the result on bus 104. The output of logic circuit 50 comprises two bits on bus 104 in accordance with the table of FIG. 6 which indicate which of the pairs of samples of adjacent points is the closest match, i.e., represents which direction has the least change of the video signal around the sample point 14.

Some specific examples of the tied situations will now be given. First assume that the signals from truncation circuits 112 and 110 (representing the horizontal direction and one diagonal direction) are tied for lowest.

Then the signal from comparator 82 is zero, which zero signal is inverted to one by inverter 140. This in turn sets the output of NOR gate 94 to zero, since if any input of a NOR gate is one, the output of the NOR gate is zero. Therefore, it is not necessary to determine the states of the remaining inputs to NOR gate 94. Since the signal from truncation circuit 110 is less than that from truncation circuit 114, the output of comparator 84 is zero, which is inverted by inverter 146. The resulting one sets the output of gate 96 to zero. Therefore, both inputs of gate 100 are zero, resulting in line 104a being zero. Since the outputs of truncation circuits 112 and 110 are equal, the output of comparator 86 is zero. This is inverted by inverter 150 to apply a one to gate 98, and therefore its output is a zero. Thus, the output of gate 102 is zero. Looking at the above table, this is the same indication on bus 104 as if the horizontal direction 112 alone was the lowest.

For the second example, assume there is a tie for lowest between horizontal 112 and vertical 116 directions. Then the output of comparator 90 is a zero, which is inverted by inverter 144 to a one, thereby setting the output of gate 94 to zero. The output of comparator 92 is also a zero, which is inverted by inverter 148 to a one, thereby setting the output of gate 96 to zero. Therefore, the output of gate 100 is zero. Further, the output of comparator 86 is zero, which is inverted by inverter 150 to a one, which one sets the output of gate 98 to zero. Therefore, the output of gate 102 is zero. Looking at the table shown in FIG. 6, this is the same indication on bus 104 as if the horizontal direction signal 112 alone were the lowest.

Now consider a third example where there is a tie for the lowest between diagonal 114 and vertical 116 directions. Then the output of comparator 84 is a one, which is inverted to a zero by inverter 146 and applied to gate 96. The output of comparator 88 is a zero, which zero is applied to AND gate 152. Since at least one input of AND gate 152 is zero, its output is zero. This zero is applied to the middle input of gate 96. The output of comparator 92 is a one, which is inverted by 148 to a zero. Since all inputs to gate 96 have now been determined to be zero, its output is a one, thus setting the outputs of both gates 100 and 102 to one. Looking at said table, this is the same output signal on bus 104 as when the diagonal direction signal 114 alone is the lowest. Thus, the above-described priority order has been implemented by magnitude ordering logic 50 of FIG. 5.

The two-bit signal on bus 104 makes up the control signal so that complete video information can be obtained upon decoding. The two control bits are applied to a switch 52 in FIG. 3, which is a two-bit switch operated in synchronization with an 8-bit switch 54 in FIG. 3 at a 7.16 MHz switching rate. This switching rate, since it is 14.32 MHz divided by 2, causes switch 54 to pass or transmit only every other 8-bit sample. The 2 control bits from logic circuit 50, that indicate which of the adjacent samples are to be used in reconstructing the untransmitted points, are passed by switch 52, and together with the 8 bits simultaneously passed by switch 54 representing a transmitted point, form a 10-bit parallel word at 10-bit parallel output 55.

It will be appreciated that many other embodiments are possible within the spirit and scope of the invention. For example, since the horizontal direction has the highest resolution, it may be desirable to steer in that direction even though another direction has been determined to be the direction of least change, if the change in the horizontal direction is within a selected range of the change in said other direction. This can be accomplished by, for example, adding a bias number to the difference signals from truncation circuits 110, 114 and 116. None is added to the signal from truncation circuit 112, since that signal represents the horizontal direction change. Thus, the horizontal direction may now be selected if the horizontal signal is less than or equal to the other signals with bias signal added. Further, a larger bias number can be added to the vertical difference signal than to the diagonal difference signals, and if a tie occurs between one of the diagonal directions and the vertical direction, the diagonal direction will be chosen in accordance with said priority order, thereby preventing loss of color information as explained above, which loss may have occurred without said larger bias number.

Since the diagonal resolution is the lowest, it is desired to select that direction last to prevent further reduction of resolution. This can be done if loss of color information is not a consideration, e.g., where color component signals (R, G, B or others) or a monochrome signal is being transmitted. Thus, the priority order in these cases would be horizontal, vertical and lastly, the diagonal directions.

What is claimed is:

1. A method of transmitting data divided into first and second portions, each portion comprising a plurality of bytes, said method comprising transmitting said first portion, comparing at least one byte of the remaining untransmitted second portion to a plurality of selected combinations of bytes of said first portion, determining which of said selected combinations of bytes of said first portion is the closest match to said one byte of said second portion, transmitting a control byte indicative of said closest match if there is only one combination which is the closest match; and transmitting a control byte indicative of a selected combination in a selected priority order if there is a tie for said closest match.

2. A method as claimed in claim 1 wherein said bytes represent samples of a video signal, said first portion represents alternately occurring samples of scanning lines, said first portion samples of adjacent lines being horizontally staggered with respect to each other, and said comparing step comprises comparing second portion samples to first portion samples that are immediately adjacent to the respective second portion sample.

3. A method as claimed in claim 2 wherein said combinations comprise in the following order of priority the average of samples representing points to the left and right of said one byte, the average of samples representing points in diagonal relationship to said one byte, and the average of samples representing points above and below said one byte.

4. A method as claimed in claim 1 wherein each of said data bytes comprises eight bits and said control byte comprises two bits.

5. A method as claimed in claim 1 further comprising forcing a tie if at least two of said combinations are within a selected amount of said one byte.

6. A device for transmitting data divided into first and second portions, each portion comprising a plurality of bytes, said device comprising means for transmitting said first portion, means for providing selected combinations of bytes of said first portion, means for comparing at least one byte of the second portion to said selected combinations, determining and generating means for determining which one of said selected combinations is the closest match to said one byte and for generating a control byte indicative of said closest match, said control byte being applied to said transmitting means, said determining and generating means generating a control byte indicative of a selected combination in a selected priority order if there is a tie for said closest match.

7. A device as claimed in claim 6 wherein said bytes represent samples of a video signal, said first portion represents alternately occurring samples of scanning lines, said first portion samples of adjacent lines being horizontally staggered with respect to each other, and said comparing means compares second portion samples to first portion samples that are immediately adjacent to the respective second portion sample.

8. A device as claimed in claim 7 wherein said combinations comprise in the following order of priority the average of samples representing points to the left and right of said one byte, the average of samples representing points of diagonal relationship to said one byte, and the average of samples representing points above and below said one byte.

9. A device as claimed in claim 6 wherein said providing means comprises a filter bank.

10. A device as claimed in claim 6 wherein said comparing means comprises a plurality of comparators.

11. A device as claimed in claim 6 wherein said determining means comprises a magnitude ordering logic circuit.

12. A method of transmitting signals comprising first and second time portions, said method comprising transmitting said first portion, and transmitting a control signal adapted to control the reconstruction of said second portion from the transmitted first portion, said first portion comprising a plurality of samples and said control signal indicating which one of said samples is the closest match to said second portion and indicating a selected sample in a selected priority order if there is a tie for said closest match.

13. A method as claimed in claim 12 wherein said first and second portions comprise video signals.

14. A method as claimed in claim 12 wherein all of said signals comprise digital signals.

15. A method as claimed in claim 12 further comprising forcing a tie if at least two first portion samples are within a selected amount of said second portion.

16. An apparatus for transmitting signals comprising first and second time portions, said apparatus comprising means for transmitting said first portions, and means for transmitting a control signal adapted to control the reconstruction of said second portion from the transmitted first portion, said first portion comprising a plurality of samples and said control signal indicating which of said samples is the closest match to said second portion if there is only one sample of said first portion which is the closest match and indicating a selected sample in a selected priority order if there is a tie for said closest match.

17. An apparatus as claimed in claim 16 wherein said first and second portions comprises video signals.

18. An apparatus as claimed in claim 16 wherein all of said signals comprise digital signals.

* * * * *